United States Patent [19]
Ball

[11] 3,976,213
[45] Aug. 24, 1976

[54] BOAT LOADER

[76] Inventor: Warren Ball, 106 Ball Airport R.D., Victoria, Tex. 77901

[22] Filed: Apr. 2, 1975

[21] Appl. No.: 564,536

[52] U.S. Cl. .............................. 214/450; 214/77 R
[51] Int. Cl.² ...................... B60P 3/10; B60R 9/04
[58] Field of Search ......................... 214/450, 77 R; 224/42.1 H; 296/23 B

[56] References Cited
UNITED STATES PATENTS

| | | | |
|---|---|---|---|
| 3,139,203 | 6/1964 | Borger | 214/450 |
| 3,531,006 | 9/1970 | Farchmin | 214/450 |
| 3,878,954 | 4/1975 | Jessee | 214/450 |
| 3,885,689 | 5/1975 | Grove et al. | 214/450 |
| 3,894,643 | 7/1975 | Wilson | 214/450 |

Primary Examiner—L. J. Paperner
Attorney, Agent, or Firm—Fulbright & Jaworski

[57] ABSTRACT

A loader for elevating a boat and shifting it over the top of a vehicle to a stowed position is disclosed. The loader includes a first load supporting frame attachable to the vehicle and includes an upright frame member, a winch and a pulley at its upper end through which a cable extends. A second load supporting frame has a wheeled dolly at one end attachable to the stern of the boat and means to pivotally connect it to the first load supporting member. The cable extends from the pulley through releasable cable guide means and is attached adjacent the stern of the boat so that reeling in of the cable causes the stern of the boat and second frame to move toward the first frame where it is attached and the cable removed from the guide means and continued reeling in of the cable lifts the stern upwardly and slides the boat to the stowed position. Other features are disclosed.

11 Claims, 9 Drawing Figures

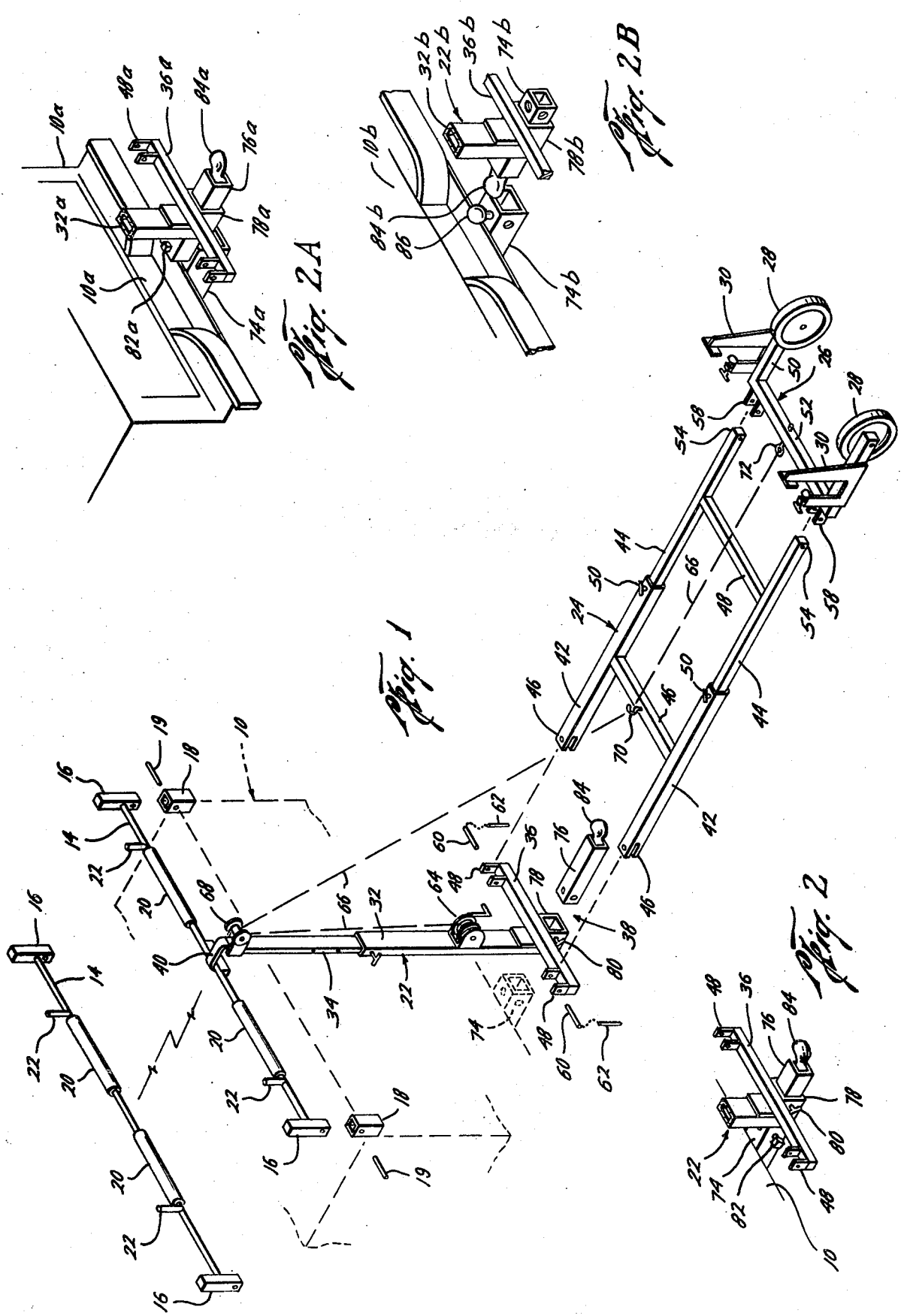

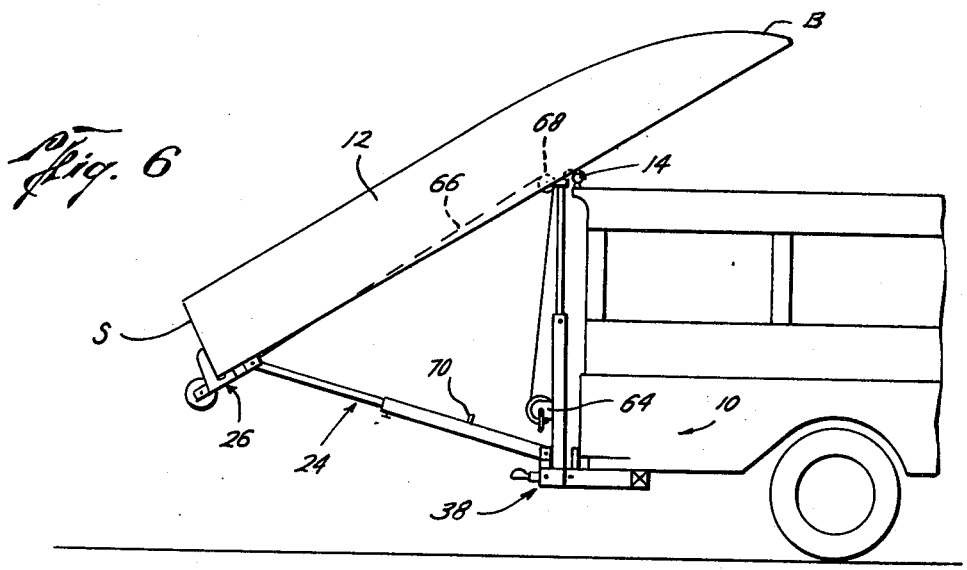
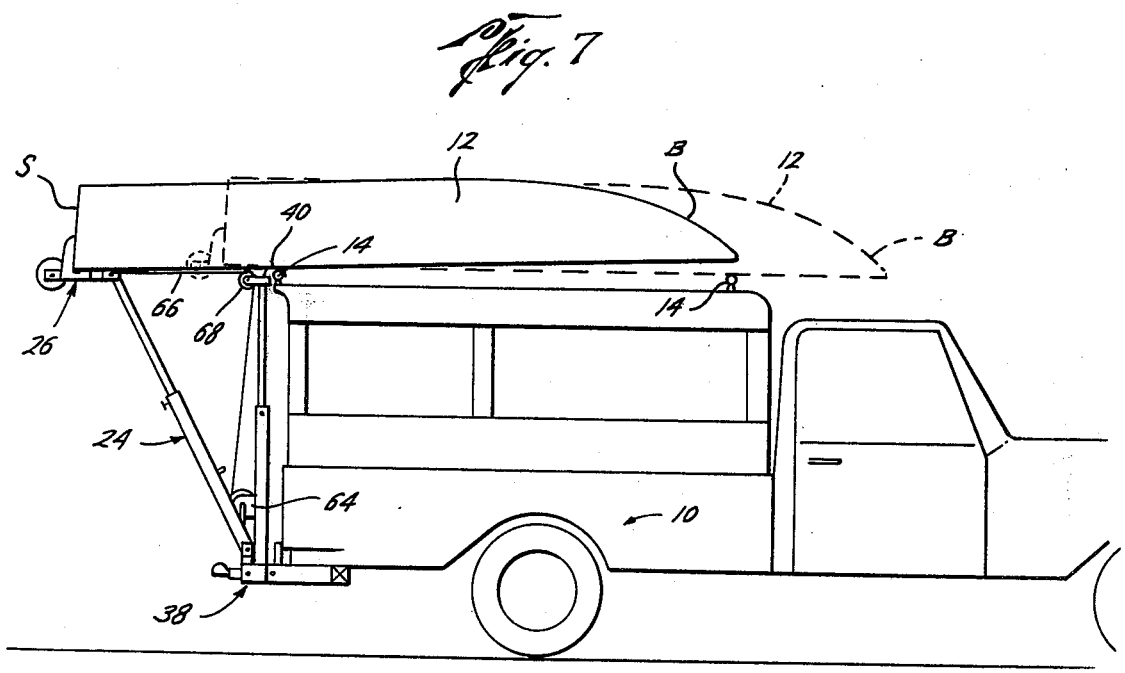

BOAT LOADER

BACKGROUND OF THE INVENTION

The following U.S. Pat. Nos. relate to boat transporters and loaders: 2,967,635; 3,478,908; 3,716,156; 3,777,922; 2,889,950; 3,139,203; and 3,819,074; however, there has been and still is a need for a boat loader which is relatively inexpensive to manufacture, which is easy and readily assembled on and removed from the vehicle with a minimum of hand tools, which is safe and easy to use for both loading and unloading a boat, and in which one person can load and unload the boat without moving from the rear of the end of the vehicle from which the vehicle is being loaded to or unloaded from its stowed position on top of the vehicle.

SUMMARY

The present invention is directed to a boat loader which is relatively inexpensive to manufacture, safe and easy to use, both loading and unloading, easily and readily installed on and removed from a vehicle with a minimum of tools, and which can be operated by one person to load a boat on top of a vehicle in a stowed position and to unload the boat therefrom without moving from the loading end of the vehicle.

In summary, the boat loader includes a first load supporting frame provided with means for attaching it to an end of the vehicle including an upright frame member extending upwardly to adjacent its top and preferably includes a cross member extending transversely at its lower portion, a wheeled dolly including attachment means for attaching the dolly to the stern of the boat, a second load supporting frame including means for pivotally connecting it to the wheeled dolly, releasable cable guide means, and means for pivotally connecting it to the first load supporting frame when adjacent thereto. A winch is secured to the first load supporting frame and a pulley is secured to and adjacent the upper end of the upright frame member. A cable extends from the winch through the pulley and has its remote end secured adjacent the stern of the boat and preferably to the wheeled dolly. Reeling in of the cable by the winch causes the stern of the boat and the inner end of the second load supporting frame to move toward the vehicle and the bow of the boat to move upwardly and toward the vehicle until the inner ends of the second load supporting frame is adjacent the first frame member and the bow of the boat is over the top of the vehicle. Attachment of the inner ends of the second frame member to the first frame member removal of the cable from the releasable cable guide means, and continued reeling in of the cable by the winch causes the outer end of the second support frame to swing upwardly into an upright position thereby lifting the stern of the boat upwardly and sliding the boat preferably on racks on the top of the vehicle into the stowed position.

Preferably, the supporting frames are extensible or variable in extensive length, rack members are provided on top of the vehicle on which the boat is stowed with the upper end of the first load supporting frame connected to a rack member and the lower end thereof connected to the end of the vehicle by a trailer hitch assembly including an adapter provided with a ball hitch connection.

It is therefore an object of the present invention to provide a relatively inexpensive, safe and easy to use loader for elevating a boat to the top of a vehicle and shfiting it over the top to a stowed position and unloading the boat from a stowed position by one person without moving from the rear or loading end of the vehicle.

A further object of the present invention is the provision of such a boat loader in which the boat is not put into an unbalanced position, and in which the loader can readily and easily be removed from the back or loading end of the vehicle to provide access to the back of the vehicle.

A further object of the present invention is the provision of such a boat loader in which the entire boat loader is relatively light and which can be easily stored in a confined space.

Other and further objects, features and advantages of the present invention will appear from the Abstract of the Disclosure, the Background of the Invention, this Summary, the drawings, the Description of the Preferred Embodiments and the Claims.

BRIEF DESCRIPTION OF THE DRAWINGS

FIG. 1 is an exploded, perspective view of a boat loader according to the invention illustrating its attachment to the loading end of a vehicle.

FIG. 2 is a perspective view of a trailer hitch assembly illustrating a connection to one type of trailer hitch.

FIG. 2a is a view similar to FIG. 2 illustrating the trailer hitch assembly connected to another type of trailer hitch on a vehicle.

FIG. 2b is a view similar to FIGS. 2 and 2a illustrating the trailer hitch assembly connected to a still different trailer hitch on a vehicle.

FIG. 6 illustrates a result of continued reeling in the cable by the winch with the bow of the boat well over the top of the vehicle and the stern of the boat being elevated.

FIG. 7 illustrates the position of the boat with the stern elevated to the top of the vehicle and the boat being shifted on the top of the vehicle into the stowed position as the cable is continued to be reeled in and completely reeled in as shown in dotted lines.

DESCRIPTION OF THE PREFERRED EMBODIMENTS

Figure 3:
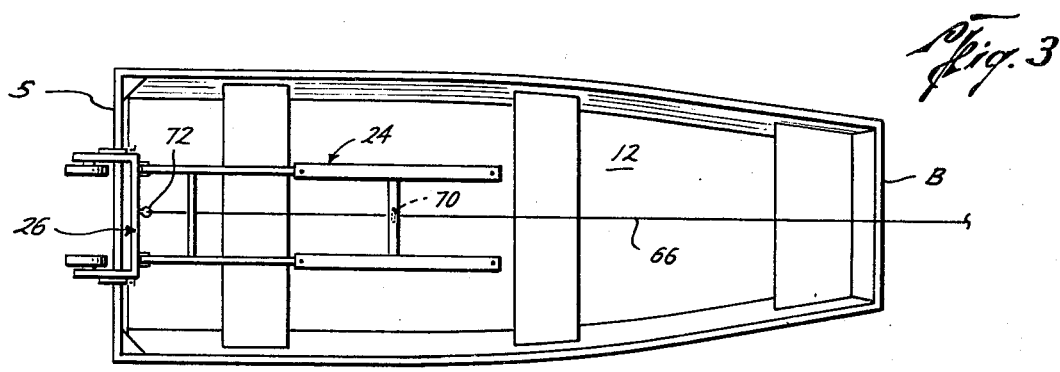
FIG. 3 illustrates a wheeled dolly connected to the stern of the boat with the outer end of the second load supporting frame pivotally secured to the dolly.
Figure 4:
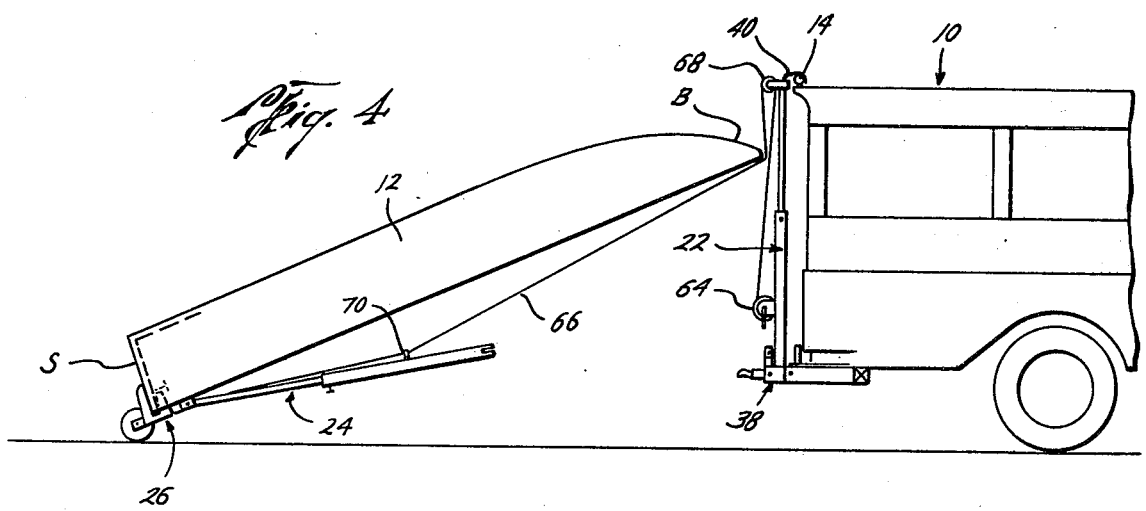
FIG. 4 illustrates the position of the boat and loader as the cable is reeled in by the winch's short distance.

Referring now to the drawings, and particularly to FIGS. 4 – 7, a vehicle generally designated by the reference numeral 10 is illustrated upon which a boat 12 is to be elevated to and shifted on its top to a stowed position such as illustrated in these figures. The vehicle may be a trailer, camper, or any other type of vehicle in which a boat may be stowed on its top.

Referring now to FIG. 1, the vehicle 10 is illustrated in dotted lines upon which are placed one or more rack members 14 provided with attachment means 16 to be removably attached to the vehicle 10, such as by the coacting attachment means 18, only one pair being shown at the loading end of the vehicle, and preferably of the quick connection and release type, such as the pins or bolts 19 being insertable into and removable from the openings illustrated. Preferably, a pair of rack members 14 are provided which extend transversely across the top of the vehicle 10 and are spaced one from the other. The rack members 14 may take any configuration as desired but, preferably, inlcude the rollers 20 and side stop members 22 so that the boat can be slid or preferably rolled across the top the vehicle 10 and secured in a stowed position.

The boat loader generally includes a first load supporting frame 22 and a second load supporting frame 24, and a wheeled dolly 26, preferably provided with a pair of spaced wheels 28 for stability although one or more wheels, rollers skids and the like may be used, and attachment means, such as the clamp members 30 so that the wheeled dolly 26 may be attached or clamped to the stern S of the boat 12 (as illustrated in FIG. 3).

Preferably, and with reference again to FIG. 1, the first load supporting frame includes an upright member 32 and is extensible in length, such as provided by the telescoping member 34 and, preferably for stability is provided with a cross member 36 at its lower portion, just above its attachment point to the lower end of the vehicle 10, such as by the trailer hitch assembly generally designated by the reference numeral 38.

Attachment means are provided adjacent the upper end of the first load supporting frame, such as by the hook like member 40 extending from adjacent the upper end of the telescoping upright member 34 hooking over and engaging the rack member 14 adjacent the end of the vehicle 10. Thus, the first load supporting frame can be securely attached to the end of the vehicle 10 by the attachment member 40 and by the trailer hitch assembly 38 (the details of which will be described later) although any desired means of attachment may be utilized.

The second load supporting frame preferably includes a pair of spaced rails 42, such as by the coacting telescoping rails 44 and, for strength and stability purposes, the cross members 46 and 48 are provided between them. In order to elevate the stern of the boat 12 as hereinafter described to a position approximating the top of the vehicle 10 and the racks 14 when utilized, the second frame member 24, here shown as the pair of telescoping rails 42 and 44, should be extensible so that they can be adjusted to a distance substantially equal to the point of attachment of their inner ends 46 to the first load supporting frame 22, here illustrated as the cross member 36 and the attachment brackets 48 to the top of the vehicle 10 including the racks 20 or other boat supporting means on its top. This is accomplished by loosening the set screws 50 and telescoping the pairs of rails 42 and 44 to this length.

When utilizing a pair of rails 42 and 44, a pair of wheels 28 are provided on the wheeled dolly 26 by means of a generally U-shaped member 50, provided with a cross member 52, to which are pivotally connected the inner ends 54 of the second load supporting frame 24, here the spaced rails 44 by means of the pivotal connecting means or brackets 58 by inserting pins, not shown, through the coacting openings illustrated. Thus, there is provided a quick make-up and release attachment means for pivotally connecting the outer end of the second load supporting frame 24, here shown as the spaced rails 44 to the wheeled dolly 26.

Similarly, pivotal attachment means 48 for connecting the inner end of the second load supporting frame 24, here shown as the rails 42, are provided which include a quick make-up and release connection by the pins 60 and 62 being placed and removed from the openings in these members.

A winch 64 is attached to the first load supporting frame 22, here illustrated as the upright 32 upon which is wound the cable 66 which extends through the pulley 68 secured adjacent the upper end of the first load supporting member 22, here illustrated as the extensible upright member 34, which cable 66 extends through a cable guide 70, here shown as an open hook attached to the cross member 46, the remote end of the cable 66 being attached adjacent the stern of the boat, here shown as attached by the eye bolt 72 to the cross member 52 of the wheeled dolly 26.

The trailer hitch assembly 38 is illustrated in FIG. 1 in expanded position and in an attached position in FIG. 2. A trailer connection member 74 is secured to the end of the vehicle 10, such as to the vehicle's bumper, not shown in these views, in any desired manner. An elongate, generally rectangular in cross section, adapter 76 is provided which extends through the co-acting rectangularly shaped sleeve 78 secured to the lower portion of the first load supporting frame 34, here shown as the upright member 32 and the cross member 36 and which also fits into the sleeve type connector 74. The sleeve 78 is provided with the lock nut 80 for securely clamping the adapter 76 in position, such as illustrated in FIG. 2, and holes are drilled in the inner ends of the adapter 76 and in the sleeve-like connector member 74 by which the adapter 76 is bolted, such as the bolts 82, as illustrated in FIG. 2. The adapter 76 has the ball hitch 84 at one end, here shown as its rearward end so that a trailer, not shown, can be hitched to the trailer hitch assembly in the usual manner, if so desired.

Advantageously, the trailer hitch assembly 36 fits three different types of hitch assemblies which are currently in widespread use, one of which is illustrated in and has been generally described in connection with FIGS. 1 and 2.

Another type of hitch connection is illustrated in FIG. 2a, to which reference is now made, and in which the reference letter *a* is used with the numerals designating corresponding parts to thosee of FIGS. 1 and 2. In this embodiment the adapter 76*a* is bolted on top of the trailer hitch connection 74*a* by means of the bolt 82*a*. Otherwise, the parts and manner of connection are the same as described as in FIGS. 1 and 2, and, accordingly no more description thereof is deemed necessary or given.

Referring now to FIG. 2b, in which the reference letter *b* has been applied to numbers designating corresponding parts in FIGS. 1, 2, and 2a, the trailer hitch assembly is illustrated connecting the lower portion of the first load supporting frame 22*b* to a ball hitch. Here, a typical ball type trailer hitch connection is illustrated which includes the ball member 86 to which the ball hitch member 84*a* is connected in the usual manner. All other parts are the same as described in connection with FIGS. 1, 2 and 2a, and, accordingly, no more description thereof is given or deemed necessary.

Thus, it is seen that the trailer hitch connection fits and is readily usable with three different types of widely used trailer hitches.

The manner of loading the boat 12 on top of the vehicle 10 is illustrated in FIGS. 3 – 7, which illustrates representative positions in the sequence of loading and unloading.

Referring first to FIG. 3, the wheeled dolly 26 is clamped to the stern S of the boat 12 and the cable 66 is threaded through the cable guide eye 70 and its remote end connected adjacent the stern S of the boat, here illustrated to the eye 72 on the wheeled dolly 26. This is accomplished with the boat 12 resting on its bottom. The boat 12 is then turned over with its bottom facing upwardly, and the operator then reels in the cable 66 by operating the winch 64. This causes the bow of the boat to be elevated and the stern S of the boat 12 and the inner end 46 of the second load supporting frame 24 to move or roll toward the vehicle 10 on the wheeled dolly 26. Continued reeling in of the cable 66 by the winch 64 causes the bow B of the boat 12 to move up and over the top of the vehicle 10 against the rack 14 and the inner end 46 of the load supporting frame 24 to come adjacent to the lower portion of the first load supporting frame 22 where these ends are pivotally connected to it, as previously described, and the cable 66 is removed from the open hook 70, as best illustrated in FIG. 5.

Referring now to FIG. 6, continued reeling in of the cable 66 by the reel 64 causes the outer end of the second load supporting frame 24 to swing upwardly thereby elevating the sterns of the boat 12 and moving the bow B of the boat up and over the top of the vehicle 10.

As illustrated in FIG. 7, continued reeling in of the cable 66 by the winch 64 causes the second load supporting frame to raise the stern S to a position substantially even with the racks 14 on the top of the vehicle 10 and causes the boat 12 to be shifted over the top of the vehicle 10 on the racks 14 into the stowed position illustrated in dotted lines. The boat 12 is now ready to be secured to the racks 14 by any suitable means, not shown, and transported as desired. Also, if desired, the boat loader may be removed from the end of the vehicle 10 simply by disconnecting the trailer hitch connection 38 and unhooking the hook like attachment member 40 from the rack 14 at the end of the vehicle 10.

Figure 5:
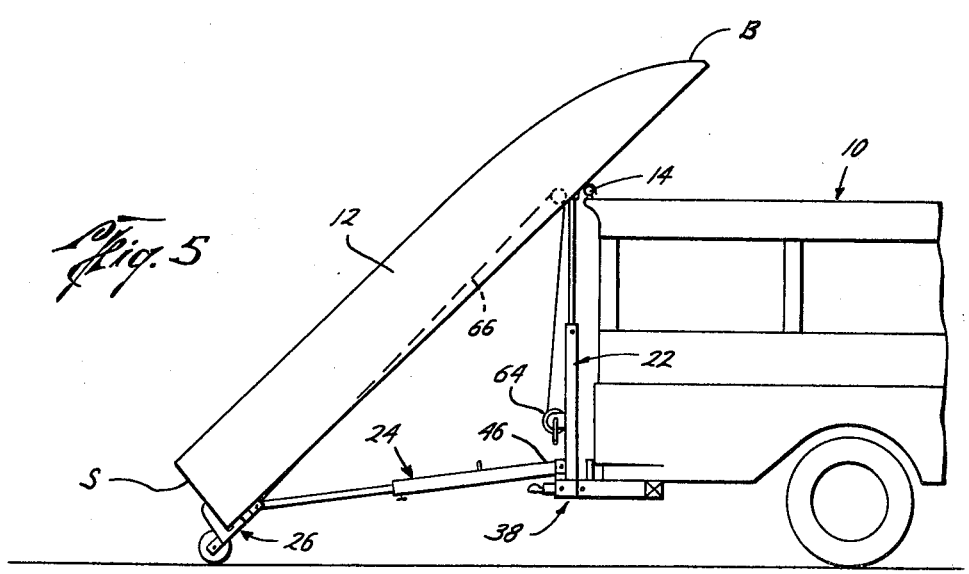
FIG. 5 is a view similar to FIG. 4 but illustrates the position of the boat and loader when the second load supporting frame is adjacent to and pivotally secured to the first load supporting frame and the cable has been removed from the open hook.

Unloading of the boat 12 from the top of the vehicle 10 is accomplished by first shifting the boat 12 into the position illustrated in solid lines in FIG. 7 and then simply unreeling the cable 66 by the winch 64, the boat 12 and the loader assuming the positions illustrated in FIG. 6 and then in FIG. 5 where the wheeled dolly 26 has touched the ground. At this time, the inner end 46 of the second load supporting frame 24 is disconnected from the lower portion of the first load supporting frame 22 and the cable 66 is slipped through the open hook 70. Continued reeling out of the cable 66 by the winch 64 permits the boat 12 to assume the position illustrated in FIG. 4 until such time as the boat 12 is completely lowered to the ground. The boat 12 may then be turned over on its bottom, the wheeled dolly 26 and thus the second load supporting frame 24 easily and quickly detached. The boat 12 is then ready for use.

Thus, the boat 12 may readily and easily be loaded on to the top of a vehicle and moved across its top to a stowed position and unloaded by a single operator without leaving the loading end of the vehicle. An individual can readily and easily handle a boat weighing 350 pounds up to 14 feet long and 6 feet wide, with the manual actuated winch 64.

If desired, the winch can be a power winch, such as driven by an electric motor with an external power source (120) using the travel trailer plug-in on the pick-up bumper of the vehicle 10.

The present invention therefore is well suited and adapted to attain the objects and ends and has the advantages and features mentioned as well as others inherent therein.

While examples of presently preferred embodiments have been given for the purpose of disclosure, changes may be made in the boat loader which are within the spirit of the invention as defined by the scope of the appended claims.

What is claimed is:

1. A loader for elevating a boat to the top of a vehicle and shifting the boat over its top to a stowed position thereon comprising,
   a first load supporting frame provided with means for attaching it to an end of the vehicle and including an upright frame member extending upwardly to adjacent the top of the vehicle,
   a wheeled dolly including attachment means for attaching the dolly to the stern of the boat,
   a second load supporting frame provided with releasable cable guide means,
   means pivotally connecting an outer end of the second load supporting frame to the wheeled dolly,
   means for pivotally connecting an inner end of the second load supporting frame to the first load supporting frame,
   the second load supporting frame extending a distance substantially equal to the distance from the means pivotally connecting its inner end to the top of the vehicle,
   a winch secured to the first load supporting frame,
   a pulley secured to the upper end of the upright frame member, and
   a cable extending from the winch through the pulley, the releasable cable guide means and having its remote end secured adjacent the stern of the boat,
   whereby reeling in of the cable by the winch causes the stern of the boat and the inner end of the second load supporting frame to move upwardly and towards the vehicle until the inner end of the second load supporting frame and the bow of the boat is over the top of the vehicle,
   attachment of the inner end of the second load supporting frame to the first load supporting frame, removal of the cable from the releasable cable guide means, and continued reeling in of the cable by the winch causing the outer end of the second load supporting frame to swing upwardly into an upright position, thereby lifting the stern of the boat upwardly and sliding the boat on the top of the vehicle into the stowed position.

2. The loader of claim 1 where,
   the second load supporting frame includes a pair of spaced rails variable in extensive length and a first cross member and
   the first load supporting frame is variable in extensive length, and includes a second cross member,
   the inner ends of the rails and the second cross member having the means for connecting the second frame to the the first frame, and
   the releasable cable guide means being disposed on the first cross member.

3. The loader of claim 1 where,
the first load supporting frame is variable in extensive length.

4. The loader of claim 1 where,
the second load support frame is variable in extensive length.

5. The loader of claim 1 where,
the second load supporting frame comprises a pair of spaced rails and a cross member extending between the rails, and
the releasable cable guide is an open guide and is disposed on the cross member.

6. The loader of claim 1 including,
at least one rack member provided with means for attachment to and arranged to extend transversely across the top of the vehicle upon which the boat is to be stowed,
the one rack member being disposed adjacent the end of the vehicle, and
the means for securing the first load supporting frame to the end of the vehicle including an attaching member extending from and adjacent the upper end of the upright frame member for attachment to the one rack member.

7. The loader of claim 1 where,
the means for attaching the first load supporting frame to the end of the vehicle includes a trailer hitch assembly including an adapter provided with a ball hitch connection.

8. A loader for elevating a boat to the top of a vehicle and shifting the boat over its top to a stowed position thereon comprising,
a first load supporting frame provided with means for attaching it to an end of the vehicle and including an upright frame member extending upwardly to adjacent the top of the vehicle and a cross member extending transversely at its lower portion, the first load supporting frame being extensible in length,
a wheeled dolly including clamp means arranged for clamping the dolly to the stern of the boat,
a second load supporting frame provided with a pair of extensible spaced rails and a cross member extending between the rails provided with an open cable guide,
the spaced rails being extensible to a distance substantially equal to the distance from the cross member to the top of the vehicle,
means for pivotally connecting outer ends of the spaced rails to the wheeled dolly,
means for pivotally connecting inner ends of the spaced rails to the cross member when adjacent thereto,
a winch secured to the first load supporting frame,
a pulley secured to the upper end of the upright frame member, and
a cable extending from the winch through the pulley and the cable guide and having its remote end secured adjacent the stern of the boat,
whereby reeling in of the cable by the winch causes the stern of the boat and the inner ends of the rails to move toward the vehicle and the bow of the boat to move upwardly and toward the vehicle until the inner ends of the rails are adjacent to the cross member and the bow of the boat is over the top of the vehicle,
attachment of the inner ends of the rails to the cross member, removal of the cable from the open guide and continued reeling in of the cable by the winch causing the outer ends of the rails to swing upwardly and into an upright position thereby lifting the stern of the boat upwardly and sliding the boat on the top of the vehicle into the stowed position.

9. The loader of claim 8 including,
at least one rack member provided with attachment means to and arranged to extend transversely across the top of the vehicle upon which the boat is to be stowed,
the one rack member being disposed adjacent the end of the vehicle, and
the means for attaching the first load supporting frame to the end of the vehicle including an attachment member extending from and adjacent the upper end of the upright member for attachment to the one rack member.

10. The loader of claim 8 where,
the means for attaching the first load supporting frame to the end of the vehicle includes a trailer hitch assembly provided with an adapter having a ball hitch connection.

11. The loader of claim 8 including,
a pair of rack members provided with attachment means to and arranged to be attached transversely across the top of the vehicle upon which the boat is to be stowed in spaced relation to one another,
one rack member being disposed adjacent the end of the vehicle and
the means for securing the first load supporting frame to the end of the vehicle comprising an attachment member extending from and adjacent to the upper end of the upright member for attachment to the one rack member and a trailer hitch assembly including an adapter provided with a ball hitch connection adjacent a lower portion of the first load supporting frame for attachment to a lower portion of the vehicle.

* * * * *